Patented June 16, 1942

2,286,577

UNITED STATES PATENT OFFICE 2,286,577

PYROMETALLURGICAL PROCESS FOR THE PRODUCTION OF PIG-IRON AND FERRO-CHROMIUM

Percy H. Royster, Montclair, N. J.

No Drawing. Original application March 9, 1939, Serial No. 260,866. Divided and this application August 5, 1941, Serial No. 405,553

4 Claims (Cl. 75—127)

This invention relates to the pyrometallurgy of a compound or complex ore (hereinafter referred to as "mixed ore") containing an oxygen compound of iron and at least one oxygen compound of at least one other metal more difficultly reducible than the oxygen compound of iron but less difficultly reducible than an oxygen compound of silicon (e. g., less difficultly reducible than $SiO_2$). The invention is concerned with an improved process of smelting such "mixed ore" whereby to produce a ferrous alloy product having a relatively high content of said "other metal." The improved process has particular applicability to the production, from low grade chrome ore (by "low grade" here being meant an ore containing a larger ratio of iron to said "other metal" than is desired to be present in the alloy product, and usually containing a substantial amount of gangue) of ferro-chromium of at least 30% grade, and iron.

The invention is concerned, also, with novel steps of the complete process.

In accordance with the general process of the present invention I subject the aforesaid "mixed ore" to a preliminary metallurgical treatment, by which treatment a substantial (e. g., major) portion of the iron content of the ore is reduced and separated out as a molten primary metal and a major portion, or substantially all, of the content of the other metal is incorporated in non-metallized form in a primary slag, whereupon said primary slag, in the second step of the process, is smelted to produce a secondary slag of low metal content and a secondary metal containing the greater part of the charge's content of said other metal. Thus, I may, in the second step, smelt in the blast furnace a pre-fused material resulting from a prior treatment of a mixed ore, by which treatment a major or at least substantial portion of the iron content of the mixed ore had been differentially or selectively smelted and separated, as liquid metal, from the concurrently produced liquid slag containing in non-metallized form the major portion of the content of "other metal" of the original ore. Differently expressed, I may subject the mixed ore to differential or selective reduction of a major portion of the iron content thereof in a blast furnace operation, thereby producing a slag having a materially lower ratio of iron to "other metal" than had the original mixed ore, and thereafter metallize the "other metal" (and also the residual iron content) in a smelting operation.

In carrying out the complete process according to the preferred embodiment thereof, in the preliminary metallurgical treatment I charge the mixed ore and solid carbonaceous fuel (e. g., coke) into a blast furnace, blow the charge with a preheated air blast, and maintain in the furnace conditions favorable to effect metallization of the major part of the iron content of the ore while retaining in the molten slag most of the content of the other metal in the form of an oxidic compound. In carrying out the second step I blow the charge with an air blast maintained at a temperature of 1200° F., or higher, so as to provide in the furnace hearth a sufficient amount of heat of high availability for reduction not only of the residual oxygen compound of iron but also of the more difficultly reducible oxygen compound present in the slag being treated.

In applying the hereinbefore generally described process to the production of ferro-chromium from a chrome ore, the first step is so carried out as to effect dissolution of metal values of the ore in a suitable mineral solvent, of relatively low melting point and low viscosity, comprising molten common refractory oxides so selected as to yield an acid solution of the ore. This solution is then smelted to a ferro-chromium alloy product.

The process of the present invention, to be described more particularly in the following paragraphs, is concerned not only with the combination of a step of preliminarily treating a chrome ore for the purpose of rendering the same more readily smeltable with the step of smelting the so treated ore, but also with the separate steps and with the product of the preliminary treatment step.

In my copending patent application Serial No. 252,448, filed January 23, 1939, (now U. S. Patent No. 2,238,078) there is described a process by which a material (specifically an ore) containing chromium oxide may be smelted in a blast furnace. It is there pointed out that the major difficulty in such a process is occasioned not by any natural "irreducibility" of the compound $Cr_2O_3$ (whether this oxide is present in isolated form, or liquid, or in solution as such or in the form of a "ferrous chromite," $FeO.Cr_2O_3$, "calcium chromite," $CaO.Cr_2O_3$, or other spinels) but rather by its highly refractive nature. Chromic oxide is readily reducible by solid carbon, at temperatures below 2000° F., according to the equation $$Cr_2O_3 + 3C \rightleftharpoons 2Cr + 3CO \qquad (1)$$

but the two reactants cannot be brought into chemically reactive contact unless the $Cr_2O_3$ is in liquid form (molten or in solution), since progress of the reaction of Equation 1 from left to right is dependent upon bringing the carbon atoms within molecular distances (e. g., $10^{-7}$ cm.) of the oxide molecule. Unfortunately, the melting point of $Cr_2O_3$ is high (4130° F.). The compound is insoluble in $SiO_2$; it forms only solid solutions with MgO (minimum temperature 4130° F.) and with $Al_2O_3$ (minimum temperature 3722° F.); and in the $CaO.Cr_2O_3$ binary system it forms the single extremely refractory compound $CaO.Cr_2O_3$, M. P. 4000° F. The two eutectics in this latter binary system are each high temperature points (3430° F., at 51% CaO and 49% $Cr_2O_3$, and 3830° F., at 21% CaO and 79% $Cr_2O_3$).

Ores containing chromium are generally rich in the spinel "chromite" (i. e., $FeO.Cr_2O_3$, M. P. 3800° F.). The binary system $FeO.Cr_2O_3$ exhibits a minimum temperature on its liquidus of 3640° F. (i. e., the eutectic between $FeO.Cr_2O_3$ and $Cr_2O_3$ at 23% FeO and 77% $Cr_2O_3$). Chromites of the exact composition $FeO.Cr_2O_3$ are of infrequent occurrence: in natural chrome ores a portion of the FeO is often replaced by MgO, and a portion of the $Cr_2O_3$ is often replaced by $Al_2O_3$ and $Fe_2O_3$. Silica present in the ore occurs generally as free quartz or else as magnesium orthosilicate (forsterite, $Mg_2SiO_4$, M. P. 3866° F.). Magnesium aluminate ("spinel") is a common contaminant. It will be seen, therefore, that a chrome ore contains $Cr_2O_3$ accompanied by the gangue oxides MgO, $Al_2O_3$ and $SiO_2$: it is highly refractory, and is not readily fluxed by CaO, which latter is also highly refractory (M. P. 4680° F.).

As has been described in my copending application above identified, I have discovered that chrome ore can be smelted in the blast furnace provided the blast temperature employed exceeds a specific minimum, with a resultant elevation of the temperature of the hearth (metal and slag baths), above conventional blast furnace practice, and more particularly with a substantial and necessary increase in the temperature of the combustion zone gases, in the tuyère breast and bosh of the furnace, above the present-day operating level. It is there disclosed that such elevation of hearth and bosh temperatures above their standard levels could successfully be accomplished by raising the temperature of the hot blast, employed in the smelting, from the prevailing range (1200-1600° F.) of present-day pig iron and ferro-manganese blast furnace practice into a completely new temperature range of from 1600° to 3000° F. Such high blast temperatures are not attainable with blast heating equipment currently used by domestic or foreign blast furnace plants, but are readily attainable by means of the so-called "pebble-type" stoves described in U. S. Reissue Patent No. 19,757.

The process of the present invention consists in an improved metallurgical procedure for effecting economic advantages in the smelting of chrome ores, by a process involving as a first step a preliminary treatment of said ore in a blast furnace whereby to bring the chromium oxide content of the same into liquid (and, therefore, smeltable) form, with subsequent smelting of the so-treated ore in a second step of the complete process. By this procedure essentially the same final result is attained that is attained by the carrying out of the process described and claimed in the aforesaid copending application, with the advantages that the thermal requirements of that single step process may be diminished and the necessity of maintaining the upper extremities of bosh and hearth temperature may materially be ameliorated, that lower hearth temperatures may be tolerated, with a consequent improvement in thermal efficiency and in fuel requirements, and that a lower blast temperature may be employed. Operation of the furnace at lower bosh and hearth temperatures results in conjugate benefits in the way of decreased heat loss, less severe wear, less rapid destruction of the furnace brick work, and in a reduction in the otherwise drastic water cooling requirements.

In accordance with the improved process of the present invention, the desired reduction of the $Cr_2O_3$ content of the chrome ore is effected by first dissolving the chrome ore in a suitable mineral solvent, of relatively low melting point and low viscosity, consisting predominantly of molten common refractory oxides, in an initial furnace operation in which a substantial reduction of the iron content of the ore is effected, and, as a second and separate operation, smelting the resulting solution, in a suitable furnace, e. g., in a blast furnace, to form the chromium alloy ferro-chromium. The first step of the process involves a diminution of the chromium concentration of the initial ore, or, in other words, a preliminary dilution or depreciation of its metallic values. The second step consists essentially in subjecting the so-dissolved ore, now in solution in the solute, to smelting conditions adapted to metallize the greater part, or substantially all, of the metal values of the dissolved ore. Both these steps, as well as the combination of the two, are new and constitute the basis of the present invention.

This preliminary dilution of the chromium content of the ore is of course contrary to, and a departure from, all previous metallurgical operations in the sense that, hitherto, the preliminary treatment of any ore as mined has been directed always towards the concentration of its reducible oxide content.

The following discussion of the metallurgy involved in my process may explain why this novel preliminary dilution is advantageous in the smelting of chrome ore:

Referring to Equation 1 above, it has been found that the equilibrium constant "K" in the thermodynamic equation $$K = (Cr)^2.(CO)^3 / (Cr_2O_3).(C)^3 \qquad (2)$$

is given by the equation $$\log_{10} K = 24.97 - 34,000/T \qquad (3)$$

wherein the bracketed quantities "(Cr)", "$(Cr_2O_3)$", "(CO)" and "(C)" refer to the "activity" of the reactants and products. The activity of solid carbon, "(C)", is unity; "(CO)" is the pressure of the CO in atmospheres; "(Cr)" is the molar concentration of chromium in the liquid metal phase (i. e., alloy bath) and "$(Cr_2O_3)$" is the molar concentration of chrome oxide in the liquid oxide phase (i. e., slag bath). Since "$(Cr_2O_3)$" appears in the denominator, any diminution of "$(Cr_2O_3)$" causes either (a) an increase in the temperature of reduction or (b) a decrease in the percentage of chromium in the alloy. Both of these effects are, per se, undesirable. For example, with an oxide phase containing 0.500 molar concentration of $Cr_2O_3$ in chemical contact with a metal bath analyzing Cr—75.0%; Fe—15.90%, and Si—1.00%, the molar concentration of "(Cr)" is 0.592. In a blast furnace hearth at 14 lbs./sq. in. pressure (gauge) the equilibrium constant K is 5.242 and, according to equation 3 above, the reduction temperature is 2060° F. ("T"=1400° K.). By diluting the $Cr_2O_3$ from 0.5 to, say, 0.1 molar concentration, the reduction temperature is raised to 2259°. However, in the present case, the equilibrium temperature in the ternary system Cr—C—O are all so low and so easily attainable in the blast furnace that the above mentioned increase in reduction temperature is not technically serious. The advantage derived from diminishing the refractoriness of the chrome material far outweighs the disadvantage of a moderate rise in reduction temperature.

The solvent or "carrier solution" for incorporating the $Cr_2O_3$ may be any convenient mixture of common refractory oxides so proportioned as to exhibit a minimum viscosity in the temperature range 2600° to 3000° F. and having a good solvent power for $Cr_2O_3$. Considerations of cost restrict the components of the mixture to the four oxides $Al_2O_3$, $SiO_2$, CaO and MgO, with such other minor oxide constituents as accompany these oxides in usual practice. Slag from a blast furnace smelting iron ore may be used, as may open hearth slag and/or Bessemer slag as the occasion may render desirable. MnO, even when sufficiently cheap, cannot advantageously be used in the solvent of the present process when one is producing high grade ferro-chromium, because the ferro-chromium product would, in such case, be contaminated with manganese.

Ores useful for the production of chromium metals and of alloys (e. g., ferro-chromium) containing high percentages of chromium, present a wide variety of compositions. $Cr_2O_3$ and FeO are always present and the gangue oxides MgO, $Al_2O_3$ and $SiO_2$ are seldom absent or negligible. Lesser amounts of CaO, $CO_2$, and water of crystallization are encountered. Phosphorus is seldom present in a troublesome amount. To illustrate a range of materials operable in carrying out the embodiments of this process, I give, in the following, the compositions of four such materials, designated ores A, B, C, and D:

| Composition | Ore A | Ore B | Ore C | Ore D |
|---|---|---|---|---|
| | Per cent | Per cent | Per cent | Per cent |
| $Cr_2O_3$ | 48.5 | 45.6 | 46.1 | 39.6 |
| FeO | 13.4 | 23.6 | 14.8 | 14.5 |
| MgO | 14.1 | 5.5 | 11.5 | 9.8 |
| $Al_2O_3$ | 11.7 | 9.3 | 14.6 | 18.7 |
| $SiO_2$ | 9.5 | 12.0 | 8.3 | 13.8 |

Since the gangue oxides present in the ore, when dissolved, alter the composition of the "carrier slag" in the carrying out of the first furnacing step of this method, it is advisable to select an appropriate composition for this solvent with reference to the particular ore to be treated. The principles governing such a selection are explained and illustrated in the following:

Example 1

In the furnace treatment of ore A above I use a coke as fuel and a blast furnace slag—here identified as "I"—as a solvent, the fuel and solvent exhibiting the following analyses:

| Blast furnace slag I ("B. F. I") | | Coke | |
|---|---|---|---|
| | Per cent | | Per cent |
| $SiO_2$ | 43.00 | $SiO_2$ | 3.10 |
| $Al_2O_3$ | 9.30 | $Al_2O_3$ | 1.80 |
| CaO | 43.90 | CaO | 0.40 |
| MgO | 2.40 | $Fe_2O_3$ | 1.30 |
| S | 1.40 | S | 0.65 |
| FeO | 0.27 | $H_2O$ | 1.35 |
| MnO | 0.43 | Volatile | 0.05 |
| | | Fixed carbon | 91.35 |

At twenty minute intervals I charge "rounds" consisting of 12,600 lbs. of slag B. F. I and 3400 lbs. of the coke, to which I add 8400 lbs. of chrome ore A. The furnace is blown with 11,000 cu. ft. per min., of atmospheric air (measured at 66° F., 30 inch mercury pressure and 60% humidity), at a pressure of 8.5 lbs./sq. inch and preheated to a temperature of 2100° F. The furnace has a hearth diameter of 14'6", and is "flushed" at thirty minute intervals, discharging 39,800 lbs. of "slag solution" at the rather high temperature of 2960° F. and showing an analysis: CaO 27.1%; MgO 7.2%; $Al_2O_3$ 10.9%; $SiO_2$ 31.2%; $Cr_2O_3$ 18.73%; FeO 3.22%; MnO 0.22; S 0.98%. The furnace top discharges 13,650 cu. ft. per minute of gas (60°—30 inch dry basis) at the temperature of 225° F., analyzing $CO_2$ 0.2%; CO 35.4%; $H_2$ 1.24%; $N_2$ 63.1%; a portion of which gas is used in the blast heating apparatus for providing the 2100° F. hot blast.

The slag discharged is permitted to crystallize and is broken, screened and stored in bins as a charge material for use in the second furnace step.

In the second step I charge a blast furnace, at twenty minute intervals, with rounds consisting of 20,520 lbs. of the slag-solution (produced as above), and 10,300 lbs. of coke. The blast furnace has a hearth diameter of 17 feet 6 inches, and is blown with 29,600 cu. ft./min. of atmospheric air (measured at 60°—30 inches of mercury, 60% of humidity), at 10 lbs./sq. inch pressure and preheated to 1450° F. The furnace is "flushed", at hourly intervals, of 49,100 lbs. of "chrome furnace slag", and is "tapped", at six-hour intervals, of 64,500 lbs. of chromium alloy. The analyses of the chrome-metal and of the chrome furnace slag are:

| Metal | | Chrome furnace slag | |
|---|---|---|---|
| | Per cent | | Per cent |
| Cr | 74.75 | CaO | 34.2 |
| C | 8.05 | MgO | 9.0 |
| Si | 1.00 | $Al_2O_3$ | 14.8 |
| Fe | 15.90 | $SiO_2$ | 40.3 |
| P | 0.12 | FeO | 0.31 |
| S | 0.08 | MnO | 0.13 |
| Mn | 0.10 | S | 1.66 |
| | | $Cr_2O_3$ | 0.46 |

The furnace discharges 38,000 cu. ft./min. (measured at 60° F., 30 inches of mercury pressure, dry basis) of gas at the high temperature of 1140° F., and the gas analyzer $CO_2$ 0.2%; CO 37.60%; $H_2$ 1.3%; and $N_2$ 60.9%. The temperature of the slag at flush is 2885° F. and of the metal at cast is 2790°, equivalent to a "hearth temperature" of 2837° F., the latter as used herein designating the average of the slag and metal temperatures at discharge.

In the two step furnace method described above I have, contrary to all the teachings of blast furnace operations, and other analogous metallurgical processes, commenced by degrading and diluting an initially "relatively high grade" chrome ore (i. e., an ore analyzing Cr 33.1%; Fe 10.4%; metallics 43.4%; gangue 46.5%); into a "slag solution" of much lower grade (Cr 12.8%; Fe 2.5%; metallics 15.3%; gangue oxides 76.6%). This slag solution comprises a liquid oxide solvent of a strongly acid nature, and in this illustration the acid oxide diluents $SiO_2+Al_2O_3$ are in excess of the basic oxide constituents $CaO+MgO$ of the solution. The molar concentration of $Cr_2O_3$ is low (e. g., 9%) and it is present in "free oxide" form. At elevated temperatures $Cr_2O_3$ does not form compounds with MgO, $Al_2O_3$ and $SiO_2$. MnO and FeO are present in such small amounts that little $FeCr_2O_3$ and $MnCr_2O_3$ can be formed. Any tendency of the $Cr_2O_3$, in this dilute acid oxide slag-solution, to combine with the CaO present in the slag solution is inhibited by the conflicting mass-action tendency of the CaO to combine with the greater molar concentrations of $SiO_2$ and $Al_2O_3$ present, the CaO present forming wollastonite ($CaSi_2O_3$) and anorthite ($CaAl_2Si_2O_8$).

The relative proportions of the three oxide components CaO, $Al_2O_3$ and $SiO_2$ occurring in molten blast furnace slags are such that there are variously present four compounds:

(a) Calcium metasilicate; $CaSiO_3$, "pseudo-wollastonite,"
(b) Calcium alumino-silicate; $CaAl_2SiO_3$; the feldspar "anorthite,"
(c) Calcium alumino-silicate; $Ca_2Al_2SiO_7$, "gehlenite",
(d) Calcium orthosilicate; $Ca_2SiO_4$—a very rare natural mineral.

Two of these four compounds are "neutral" or "indifferent" with respect to basicity and acidity, viz., pseudo-wollastonite containing a single mol each of a base (CaO) and of an acid ($SiO_2$) and gehlenite containing 2 mols of basic oxide (2CaO) and two mols of acid oxide ($Al_2O_3+SiO_2$). However, the feldspar, anorthite, is extremely acid; containing only one mol of basic oxide (CaO) and three mols of acid oxides ($Al_2O_3$ plus two $SiO_2$). Anorthite is a de-chromitizing agent, the excess of acid oxides, $Al_2O_3$ and $SiO_2$, tending to suppress the formation of any calcium chromite. The presence of MgO in the slag solution assists this suppression. The following equation is believed to illustrate this dechromatizing action:

$CaCr_2O_4+CaAl_2Si_2O_8+MgO=$
(Calcium    (Anorthite)
chromite)

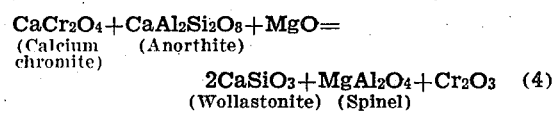

$2CaSiO_3+MgAl_2O_4+Cr_2O_3$ (4)
(Wollastonite) (Spinel)

Reference to the well-known phase diagram of the ternary system lime-alumina-silica as given by Rankin and Wright (Jour. of Science, vol. 39, 1915, page 1), serves as an adequate guide to the selection of a slag solvent having a constitution which will prevent the formation, in the slag solution, of any substantial amount of the refractory calcium chromite. Were the latter present (in substantial amount) in the solution it would increase the viscosity of the solution and produce a liquid solution which would not exhibit desirable "free flowing" characteristics but rather would cause operative difficulties in the blast furnace bosh and hearth. I have found, however, that by the addition to the furnace charge of a mixture—preferably, prefused—of $SiO_2$ and $Al_2O_3$ with CaO and MgO I am enabled to maintain in uncombined oxide form the $Cr_2O_3$ content of the slag solution, to prevent formation of any objectionable amount of calcium chromite, and to produce the metallurgically valuable new intermediate product described here, which product is peculiarly suitable for smelting into ferro-chromium. This solution of $Cr_2O_3$ in a slag solvent exhibits a substantially lower melting point and a lower viscosity than the original chrome ore.

The amount of dilution of $Cr_2O_3$ in the solution must, of course, be controlled within reasonable limits: its extent depends upon the composition of the original ore. The relative amounts of slag-solvent and ore in the charge will vary in the case of the several ores encountered in practice, as is indicated by the further illustrations following:

*Example 2*

With the same furnace of Example 1, and with the same wind, the rounds are: 4000 lbs. of coke; 5900 lbs. of slag (B. F. I); and 14,000 lbs. of ore B. The slag-solution produced has the analysis: CaO—15.6; MgO—4.8; $Al_2O_3$—11.7; $SiO_2$—26.4; $Cr_2O_3$—38.5; S—0.62; FeO—2.20. The blast temperature is 1200° F. The accumulation of metal (mostly iron) in the furnace hearth, from unavoidable reduction, is greater in this case (11,200 lbs. per hour) than in Example 1 ore A (viz., 1380 lbs. of metal per hour), the increased amount of metal below the slag bath being due to the higher FeO content of ore B.

The slag produced in Example 2 is only 24,700 lbs. at each 30-minute flush but its $Cr_2O_3$ content is higher (38.5%) than in Example 1, and the slag solution is excessively acid, its "basicity" $(CaO+MgO)/(Al_2O_3+SiO_2+Cr_2O_3)$ being only 0.266. This extremely acid slag demands a high hearth temperature to produce sufficient fluidity to permit its removal from the hearth, which fact accounts for the higher coke ratio, in spite of the lesser amount of slag charged per round.

*Example 3*

With the same blast volume and furnace, in smelting ore C the slag solvent is not a blast furnace slag (from a pig iron operation, as was "B. F. I") but is the "chrome furnace slag" produced in the operation described in Example 1. The rounds are: 2520 lbs. of coke, 8450 lbs. of the chrome furnace slag, and 8450 lbs. of chrome ore C. The blast temperature is 1400° F., and at each 30-minute flush there is tapped 23,300 lbs. of "slag solution" showing an analysis: CaO 18.7%; MgO 11.3; $Al_2O_3$ 16.4; $SiO_2$ 27.0; $Cr_2O_3$ 25.2; FeO 1.4; and S 0.62. Metal (mostly iron) accumulates below the slag bath at the rate of 4100 lbs./hour, and analyzes 4.1% chromium, indicating a loss of chromium of 2.03% in the course of converting the ore into a slag solution. In the present illustration the slag solvent is a material which has been produced in the second step of the complete process, and illustrates a recycling of the carrier solvent in contrast to the employment of a blast furnace slag taken from another furnace operation. The value and cost of these slags is so small that the selection of a solvent slag depends upon location, availability, transportation, and handling, rather than on any metallurgical consideration.

Whereas it is desirable and essential that the "basicity" of the solution produced be acid, to suppress the formation of calcium chromite, it is not necessary in every case that the added solvent itself be "acid." As the gangue oxides of the chrome ore dissolve in the solvent, the relative amounts of MgO, Al₂O₃, CaO and SiO₂ are altered, and it is the "acidity" of the "solution"—not of the "solvent"—which is the determining factor in the control of the chromite formation.

As an example of the use of a basic solvent slag for producing an "acid solution" of chrome ore the following illustration is given:

Example 4

The iron blast furnace slag ("B. F. II"), used as the diluting solvent, is as basic as is generally encountered in practice, having the analysis CaO—46.4%; MgO—6.5; Al₂O₃—16.1; SiO₂—29.7; FeO—0.3; MnO—0.4; S—1.3. This carrier solvent has a basicity materially greater than unity, viz., CaO+MgO=52.9%, Al₂O₃+SiO₂=45.8%, or a basicity ratio of 1.15.

The furnace of the previous illustration is blown with unchanged air preheated to 1800° F. The rounds consist of 3400 lbs. of coke, 8600 lbs. of the slag, "B. F. II," and 15,000 lbs. of chrome ore D. The furnace is flushed at 30 minute intervals, discharging 32,600 lbs. of a slag solution analyzing: CaO—19.3%; MgO—9.4; Al₂O₃—19.2; SiO₂—21.4; Cr₂O₃—26.7; FeO—3.5; S—0.62. The basicity of this slag solution is substantially less than unity, viz., CaO+MgO=28.7%; Al₂O₃+SiO₂+Cr₂O₃=67.3%, or a ratio of basic oxides to acid oxides of 0.425, although the slag solvent initially was "basic."

I have found that slag solutions containing as much as 15% to 25% Cr₂O₃ are handled in the bosh and hearth of the blast furnace without noticeable difficulties from the standpoints of infusibility and viscosity, as in ordinary iron furnace slags. In the second step of the process no difficulty in smelting ores is encountered, the reduction of even these dilute solutions of Cr₂O₃ readily being carried on to substantial completion with a recovery of better than 90% of the chromium. Whenever the relative proportion of the gangue oxides MgO, Al₂O₃ and SiO₂, originally present in the chrome ore, permits, I prefer to use a more concentrated chrome solution, with Cr₂O₃ in excess of 30% or 35% When the Cr₂O₃ content is as great as 40% or above, difficulties in smelting arise comparable to the difficulties in smelting an untreated and undiluted ore. I have found that whenever a sufficiently high blast temperature is available, most chrome ores may be smelted directly, as described in the hereinbefore mentioned copending application. In almost all usual circumstances the preliminary furnacing of a chrome ore with the solvent, in order to dilute the same into a fused acid mixture with SiO₂, Al₂O₃, MgO and CaO, effects a sufficient improvement in its smeltability so that the double furnacing effects a material improvement in the over-all economy of the process, as well as in the quality of the ultimate product.

It should be understood that whereas I prefer to introduce the diluting oxides SiO₂, Al₂O₃, CaO and MgO into the blast furnace in the form of a prefused slag, it is possible to carry out the first step of the process by adding the proper amounts of SiO₂, Al₂O₃, MgO and CaO in merely physical admixture: for example, the SiO₂ and Al₂O₃ may be added as an argillaceous shale, and the CaO and MgO as dolomite or as dolomitic limestone. When the prefused slag is added, the constituents of the solvent melt promptly and flow more rapidly than when the several basic and acid oxide diluents are added in the form of discrete mineral lumps, in which latter case some delay is occasioned in realizing contact between the constituent oxides to form the liquid solvent. In most localities where the furnacing of chrome ores by my process is convenient, an abundance of blast furnace slag is available and cheap. Whenever the composition of the preformed slag to be employed as solvent is not adapted to the production of a desirable solution, its composition can be adjusted by the addition of acid oxides or of basic oxides, as the case requires, to the furnace charge in addition to the coke, chrome ore and slag.

I prefer for reasons of cost to carry out both steps of the process in suitable blast furnaces. I can use two blast furnaces, one of which is devoted to one step, the other to the other; or, when plant facilities are limited, I can carry out the two steps of the process in the same furnace but at different times.

It is pointed out that in carrying out the first step of this process the metallurgical objective is the dilution of the chrome ore to produce an acid slag solution of diminished Cr₂O₃ content. This means that the blast furnace is run as a melting furnace of high thermal efficiency employing a cheap fuel. The fact that the blast furnace so used is a notably efficient reducing furnace does not dictate its employment for the first step. On the contrary, in carrying out the first step of my process I operate the blast furnace under as restricted "reducing conditions" as I am able to realize without destroying its effectiveness as a melting furnace, in order to maintain at a minimum the amount of metallization of the reducible oxides contained in the charge. The methods of obtaining diminished reduction in the bosh and hearth of a blast furnace I have described in my copending application Serial No. 234,847, filed October 13, 1938, entitled "Blast furnace treatment of low grade manganese-iron ore" (now Patent No. 2,265,863). While in the process of that application the reduction being suppressed is reduction of MnO, and not Cr₂O₃ as in the present method, the operative methods therein described I have found to be equally effective in minimizing the reduction of the Cr₂O₃, and whenever these methods are applicable I specifically include them as ancillary features of the present invention.

This application is a division of my application Serial No. 260,866, filed March 9, 1939, now Patent No. 2,265,865.

I claim:

1. Two-step process for the production of pig iron and ferro-chromium from a low-grade chrome ore containing, together with gangue material, a larger ratio of iron to chromium than is desired in the final ferro-chromium product, which comprises as a first step charging into a blast furnace the low-grade chrome ore, solid carbonaceous fuel and a mineral solvent for the chromium oxide content of said ore, said mineral solvent consisting predominantly of the common refractory oxides Al₂O₃, SiO₂, CaO and MgO and low in reducible oxides such as the oxides of iron and manganese, the ingredients of said mineral solvent being so proportioned as to yield with the gangue material of said ore an acid primary slag, operating the blast furnace under minimized reducing conditions adapted to depress metallization of chromium oxide while producing molten iron and a molten acid primary slag solution of chromium oxide in which the concentration of chromium oxide is lower than was the concentration of chromium oxide in said ore, and separating the molten iron from said slag solution, and as a second step smelting the slag solution, in a blast furnace, with solid carbonaceous fuel to produce ferro-chromium and a final slag poor in recoverable metal values.

2. The process defined in claim 1, wherein the mineral solvent employed in the first step is a composition exhibiting a minimum viscosity in the temperature range 2600°–3000° F.

3. The process defined in claim 1, wherein the mineral solvent employed in the first step consists mainly of a slag from the blast furnace smelting of iron ore.

4. The process defined in claim 1, wherein the mineral solvent employed in the first step consists essentially of recycled final slag from the second step of the process.

PERCY H. ROYSTER.